US011930817B2

United States Patent
Arumugam et al.

(10) Patent No.: US 11,930,817 B2
(45) Date of Patent: *Mar. 19, 2024

(54) WOOD PRESERVATIVES

(71) Applicant: Nutrition & Biosciences USA 2, LLC, Rochester, NY (US)

(72) Inventors: Selvanathan Arumugam, Blue Bell, PA (US); David A. Laganella, Swedesboro, NJ (US); Randall W. Stephens, Collegeville, PA (US)

( * ) Notice: Subject to any disclaimer, the term of this patent is extended or adjusted under 35 U.S.C. 154(b) by 443 days.

This patent is subject to a terminal disclaimer.

(21) Appl. No.: 17/280,973

(22) PCT Filed: Sep. 24, 2019

(86) PCT No.: PCT/US2019/052595
§ 371 (c)(1),
(2) Date: Mar. 29, 2021

(87) PCT Pub. No.: WO2020/068746
PCT Pub. Date: Apr. 2, 2020

(65) Prior Publication Data
US 2021/0352901 A1 Nov. 18, 2021

Related U.S. Application Data

(60) Provisional application No. 62/738,455, filed on Sep. 28, 2018.

(51) Int. Cl.
| | |
|---|---|
| B27K 3/15 | (2006.01) |
| A01N 43/80 | (2006.01) |
| B27K 3/40 | (2006.01) |
| B27K 3/50 | (2006.01) |
| C08G 18/28 | (2006.01) |
| C08G 18/48 | (2006.01) |
| C08G 18/75 | (2006.01) |
| C08G 18/76 | (2006.01) |
| C08K 5/3415 | (2006.01) |
| C09D 5/14 | (2006.01) |
| C09D 7/20 | (2018.01) |
| C09D 15/00 | (2006.01) |
| C09D 175/08 | (2006.01) |
| C09D 175/12 | (2006.01) |

(52) U.S. Cl.
CPC ............ *A01N 43/80* (2013.01); *B27K 3/40* (2013.01); *B27K 3/50* (2013.01); *C08G 18/2825* (2013.01); *C08G 18/283* (2013.01); *C08G 18/2865* (2013.01); *C08G 18/4825* (2013.01); *C08G 18/755* (2013.01); *C08G 18/7671* (2013.01); *C08K 5/3415* (2013.01); *C09D 5/14* (2013.01); *C09D 7/20* (2018.01); *C09D 15/00* (2013.01); *C09D 175/08* (2013.01); *C09D 175/12* (2013.01); *B27K 2240/20* (2013.01)

(58) Field of Classification Search
CPC ....................................................... B27K 3/15
See application file for complete search history.

(56) References Cited

U.S. PATENT DOCUMENTS

| | | | |
|---|---|---|---|
| 5,023,309 A | 6/1991 | Kruse et al. | |
| 6,437,020 B1 | 8/2002 | Amick et al. | |
| 6,610,282 B1 | 8/2003 | Ghosh | |
| 7,740,906 B2 | 6/2010 | Ashmore et al. | |
| 7,959,723 B2 | 6/2011 | Llosas et al. | |
| 9,273,210 B2 * | 3/2016 | Schrinner | C09D 5/00 |
| 9,402,860 B2 | 8/2016 | Kovacs et al. | |
| 2003/0108760 A1 | 6/2003 | Haas et al. | |
| 2006/0240263 A1 * | 10/2006 | Ashmore | C08L 97/02 |
| | | | 428/414 |
| 2011/0098417 A1 | 4/2011 | Worley et al. | |
| 2021/0112812 A1 | 4/2021 | Arumugam | |

FOREIGN PATENT DOCUMENTS

| | | | |
|---|---|---|---|
| EP | 1113043 A2 * | 7/2001 | ............ A01N 43/80 |
| WO | 97/02134 A1 | 1/1997 | |
| WO | WO-9702134 A1 * | 1/1997 | ............ C08G 18/12 |
| WO | 08078720 A1 | 7/2008 | |

OTHER PUBLICATIONS

International Search Report from corresponding International Application No. PCT/US2019/052595, dated Dec. 13, 2019, four pages.

* cited by examiner

*Primary Examiner* — Cachet I Proctor

(57) ABSTRACT

A wood preservative composition and method for preserving wood by contacting wood with said composition comprising a polyurethane polymer, non-aqueous solvents, and a wood preservative active.

10 Claims, No Drawings

WOOD PRESERVATIVES

The present invention relates to a wood preservative composition and method for preserving wood to impart protection from wood-decaying organisms.

There are many methods and compositions for preserving wood prior to the time the wood is put in use. Also, preservatives for treating wood in place are available on the market including both oil-based and water-based products. The oil-based products generally consist of petroleum oils with pentachlorophenol or creosote. U.S. Pat. No. 7,959,723 describes one such composition employing oil-soluble preservatives for wood. From the standpoint of toxicity and environmental pollution, these active ingredients are less than desirable.

The problem addressed by this invention is the need for a more environmentally friendly wood treatment composition which is capable of efficaciously imparting active ingredients.

The present invention is directed to a method for preserving wood comprising contacting wood with a wood preservation composition comprising a) a polyurethane polymer synthesized from a polyol comprising >95% p-propylene oxide; an isocyanate, and a capping agent; b) an organic solvent; and c) at least one wood preservative active selected from among halogenated isothiazolone biocides, halogenated carbamate fungicides and azole fungicides; wherein the capping agent is selected from the group consisting of a mono alcohol, a secondary amine, a primary amine with alkyl chain greater than C15 and mixtures thereof; and further wherein the molecular weight of the polyol is greater than or equal to 2700.

The present invention is further directed to a wood preservation composition comprising a) a polyurethane polymer synthesized from a polyol comprising >95% p-propylene oxide; an isocyanate, and a capping agent; b) an organic solvent; and c) at least one wood preservative active selected from among halogenated isothiazolone biocides, halogenated carbamate fungicides and azole fungicides; wherein the capping agent is selected from the group consisting of a mono alcohol, a secondary amine, a primary amine with alkyl chain greater than C15 and mixtures thereof; and further wherein the molecular weight of the polyol is greater than or equal to 2700.

All percentages and part per million (ppm) values are on the basis of total weight of the composition, unless otherwise indicated. The terms "a" or "an" refer both to the singular case and the case where more than one exists. All range endpoints are inclusive and combinable. As contained herein all molecular weights are number average molecular weight and are determined by Gel Permeation Chromatography (GPC). It is envisioned that one skilled in the art could select and/or combine multiple suitable and/or preferred embodiments in the present invention.

The wood preservative compositions of the present invention comprise polyurethane polymers that are synthesized from bis hydroxy terminated polypropylene oxide macromere (polyol), an isocyanate, and an appropriate capping agent. Polyurethane polymers, as used herein, may contain other functional groups derived from reaction of isocyanates with other monomers, e.g., amide groups derived from carboxylic acids, and ureas derived from amines, e.g. ethylene diamine (EDA) or other polymers, such as polyesters, e.g., polyesters derived from adipic acid and 1,6-hexanediol, 1,4-butanediol and/or neopentyl glycol, or polycarbonates, e.g. polycarbonates derived from poly 1,6-hexanediol carbonate. Suitable isocyanates include, e.g., methylene bis(4-cyclohexylisocyanate) (MCI), methylene bis(4-phenylisocyanate) (MDI), polymethylenepolyphenol isocyanate (pMDI), hexamethylene diisocyanate (HDI), isophorone diisocyanate (IPDI) and toluene diisocyanate (TDI) and combinations thereof. Preferably, the isocyanates of the present invention are diisocyanates. Examples of suitable diisocyanates include IPDI, pMDI, MDI and combinations thereof. More preferably, the diisocyanate is IPDI. The polyol used to make the polyurethane in the present invention is >95% p-propylene oxide having a molecular weight greater than or equal to 2700. Suitably the isocyanate to polyol molar ratio of the polyurethane polymers is from less than 4 to greater than or equal to 1.05, alternatively from less than or equal to 2 to greater than or equal to 1.05

Polyurethane polymers of the present invention are capped. According to the present invention, the capping agent is an amine or alcohol. The polyurethane is capped with a monoamine or monoalcohol, for example butyl amine, octanol, octyl amine or combinations thereof. Specifically, the capping agent is at least one of a mono primary alkyl amine, mono secondary alkyl amine or mono alcohol. In accordance with the present invention, all primary alcohol, all secondary amine, and >C15 alkyl chain primary amine capping agents are suitable and mixtures thereof. The polyurethane polymer is synthesized in a non-aqueous solvent or a mixture of non-aqueous solvents. Preferably, the amount of solvent is from 60% to 90%, more preferably from 70% to 90%, and most preferably from 75% to 90%. Suitable solvents include ester and ether solvents having a boiling point of at least 150° C., and preferably a flash point of at least 60° C. Examples of such solvents include, alkanes, branched alkanes, aromatics, e.g., Mineral spirits, toluene, benzyl alcohol, xylenes, and alkyl benzenes. A suitable mixture of non-aqueous solvents useful in the present invention is Aromatic 200 (CAS No. 64742-94-5).

The wood treatment composition of the present invention, in addition to polyurethane polymer, further comprises a wood preservative active. The wood preservative active may be selected from the class of halogenated isothiazolinone biocides, halogenated carbamate fungicides, metal salts of naphthenic acids, and azole fungicides. When the wood preservative active is a halogenated isothiazolinone biocide, it preferably comprises a 3-isothiazolone having a C4-C12 N-alkyl substituent, more preferably a chlorinated 3-isothiazolone, and most preferably 4,5-dichloro-2-n-octyl-4-isothiazolin-3-one ("DCOIT"). Mixtures of wood preservatives actives may be used. When the polyurethane polymer is combined with DCOIT a suitable composition includes 23% polyurethane polymer solids, 23% DCOIT, and 54% Aromatic 200.

The composition used to treat wood preferably contains from 100 ppm to 40,000 ppm wood preservative, more preferably from 200 ppm to 30,000 ppm, and most preferably from 300 ppm to 25,000 ppm. Preferably, the polymer solids content of the composition is from 10% to 40%, more preferably from 10% to 30%, and most preferably from 15% to 30%. Preferably, the polymer solids to biocide ratio is from 2:1 to 1:2, more preferably from 2:1 to 1:1.

Another critical element of the wood preservation composition is an organic solvent. The polyurethane polymer is diluted with organic solvent. Suitably, the organic solvent is diesel, however other organic solvents known to those of skill in the art may be used. In some embodiments the organic solvent is not the same compound as the non-aqueous solvent of the present invention. As used herein, diesel is defined as the fractional distillation of crude oil between 200° C. (392° F.) and 350° C. (662° F.) at atmospheric pressure, resulting in a mixture of carbon chains that typically contain between 8 and 21 carbon atoms per molecule or biodiesel that is obtained from vegetable oil or animal fats (biolipids) which have been transesterified with methanol (fatty-acid methyl ester (FAME)) and mixtures thereof.

The compositions used in the present invention may optionally contain additional components including but not limited to stabilizers, dyes, water repellents, other wood biocides, fungicides and insecticides, antioxidants, metal chelators, radical scavengers, etc. Stabilizers include, e.g., organic and inorganic UV stabilizers, such as, copper oxide or other copper salts or complexes that resist leaching; zinc oxide; iron salts, iron oxide, iron complexes, transparent iron oxide and nanoparticle iron oxide; titanium dioxide; benzophenone and substituted benzophenones; cinnamic acid and its esters and amides; substituted triazines, such as triphenyl triazine and substituted phenyl triazine UV absorbers, benzotriazole and substituted benzotriazole UV absorbers; hindered amine light stabilizers, used individually or in combination. Water repellents include, e.g., various wax-type water repellents, e.g., paraffin, carnauba, and polyethylene waxes; and silicones. Other wood biocides, fungicides, such as copper metal, bethoxazin and cyproconazole, chlorothalonil, tebuconazole, propiconazole, pentachlorophenol, creosote, copper napthenate, dialkyl dimethyl quaternary ammonium carbonate/bicarbonate, and insecticides include, e.g., those listed in U.S. Pat. No. 6,610,282, e.g., imidacloprid, thiacloprid, permethrin, and etofenprox. Antioxidants include any commercially available antioxidant compounds, e.g., phosphite antioxidants such as IRGAFOS; lactone antioxidants; phenolic antioxidants such as BHT; ascorbic acid; and IRGANOX and the like. Metal chelators include, e.g., EDTA, NTA, 1,10-phenanthroline, ACUMER 3100, DEQUEST, TAMOL 731, tripolyphosphate and other inorganic and organic compounds and polymers useful in chelating or dispersing metal salts. Radical scavengers include, e.g., TEMPO.

Preservation of wood is performed by contacting the wood with the wood preservation composition described herein, preferably under conditions that comply with American Wood Protection Standards T1-16 and meet conditions for use specified in U1-16. In order to provide long term protection, the preservative needs to "fix" in the wood and not deplete too rapidly by volatilization or by leaching when the wood gets wet. It might be expected that enhanced penetration or enhanced movement of the preservative deep into the wood during treatment might also lead to reduced fixation of the organic wood preservative active.

EXAMPLES

Synthesis of Polyurethane Polymers:

The following polyurethanes were synthesized from a bis hydroxy terminated polypropylene oxide (polyol) and a diisocyanate (IPDI or MDI). 150 mL of anhydrous polypropylene oxide in aromatic 200 (solvent, 10-30 wt % solution), diisocyanate (2 molar equivalents of isocyanates to hydroxyl groups), was charged with 0.003% of a tin catalyst (dibutyltin dilaurate) to the reactor. Polyols of three varying molecular weights were tested: 4000 MW, 2700 MW, and 2000 MW. The reactor was heated to 90° C. with overhead stirring. The reaction mixture was held at 90° C. for 1 h.

The residual isocyanate, in the polyurethane capped examples, is measured using Surface SWYPE™ test strips. The reaction product was cooled to room temperature and the capping reagent, mono amine (1 equivalent amine to unreacted isocyanate) was added to cap the remaining isocyanate groups in the reaction mixture. Alternatively, when mono alcohol (1 equivalent hydroxyl to unreacted isocyanate) was used as the capping reagent it was added at 90° C. and reacted for an additional 1 h at 90° C. The reaction is continued at 90° C. until no free isocyanate was observed when tested with SWYPE™ test strips. The polymer solids of the PU solution was estimated from the conversion and the amount of reactants used for the reaction. The polymer solids are calculated as the sum of the reactive components in the synthesis of the polymer.

Procedure to Determine Diesel Compatibility:

In a clear, 1 oz vial, 0.1 gram of the polymer (on a 100% polymer solids basis) is diluted with 9.9 grams of diesel fuel (weight/weight) to a 1% solution of the polymer. The sample is maintained at room temperature for 48 hours. After 48 hours, the solution is checked for incompatibility, defined as phase separation, precipitation of the polymer as solids, and/or turbidity.

Calculations of Hansen Solubility Parameters:

Hansen solubility parameters (HSP) for the various polyurethane end cap segments were computed using HSPiP software (Purchased from https://www.hansen-solubility.com/). Predicted HSPs (using the Y-MB method), namely, the HSP for the dispersion (D), polar (P), and hydrogen bonding (H) contributions (all SP in MPa1/2), the total SP (calculated using the predicted HSP), and "End cap distance from diesel" were computed. According to the HSP theory, the distance between two materials is a measure of the solubility. The smaller the distance the more soluble the fluids are within one another. HSP data for a "diesel" was obtained from the literature (Batista et al. J. Am. Oil Chem. Soc. V92, 95, 2015).

$$\delta_T = \sqrt{\delta_D^2 + \delta_P^2 + \delta_H^2}$$

$$R_a = \sqrt{4(\delta_{D1} \delta_{D2})^2 + 4(\delta_{P1} - \delta_{P2})^2 + 4(\delta_{H1} - \delta_{H2})^2}$$

$\delta_{D1}$=Dispersive solubility parameter for Diesel=14.51

$\delta_{D2}$=Dispersive solubility parameter for a given end group ($\delta_D$)

$\delta_{P1}$=Polar solubility parameter for Diesel=3.18

$\delta_{P2}$=Polar solubility parameter for a given end group ($\delta_P$)

$\delta_{H1}$=H-bonding solubility parameter for Diesel=5.97

$\delta_{H2}$=H-bonding solubility parameter for a given end group ($\delta_H$)

TABLE 1

Diesel Compatibility of PU Polymers with 100% p-iPO and IPDI with various cap segments (MW = 2700 to 4000)

| | | Calculated Hansen Solubility Parameters (MPa$^{1/2}$) for End Cap Segment and "End Cap" distance from "Diesel" (Ra) | | | | | Diesel compatibility (1 wt. %) | |
|---|---|---|---|---|---|---|---|---|
| | | | | | | | Polyol MW = 4000 EX-1-22; | Polyol MW = 2700 EX-1-22; |
| Example # | End Capping Reagent | $\delta_T$ | $\delta_D$ | $\delta_P$ | $\delta_H$ | Ra | Comp 1-9 | Comp 1-9 |
| EX-1 | Methanol | 28.4 | 19.1 | 16 | 13.6 | 17.5 | YES | YES |
| EX-2 | 1-Propanol | 23.4 | 17.8 | 11.5 | 10 | 11.3 | YES | YES |
| EX-3 | 2-Propanol | 22.7 | 17.5 | 11.4 | 8.9 | 10.6 | YES | YES |
| EX-4 | 1-Butanol | 22.7 | 17.5 | 10.4 | 10 | 10.2 | YES | YES |
| EX-5 | 2-Butanol | 21.8 | 17.3 | 9.8 | 8.9 | 9.1 | YES | YES |
| EX-6 | Sec-Butanol | 21.7 | 17.2 | 10.1 | 8.5 | 9.1 | YES | YES |
| EX-7 | 1-Pentanol | 21.9 | 17.4 | 9.5 | 9.2 | 9.2 | YES | YES |
| EX-8 | 1-Hexanol | 21.1 | 17.2 | 8.9 | 8.4 | 8.2 | YES | YES |
| EX-9 | 1-octanol | 19.8 | 16.9 | 7.6 | 6.9 | 6.6 | YES | YES |
| EX-10 | Docosanol | 17.1 | 16.2 | 4.3 | 3.4 | 4.4 | YES | YES |
| EX-11 | Propylene glycol butyl ether | 20.9 | 17 | 9.2 | 8 | 8.1 | YES | YES |
| EX-12 | Dimethylamine | 26.1 | 18.3 | 14.3 | 11.9 | 14.7 | YES | YES |
| EX-13 | Diethylamine | 23.1 | 17.3 | 12.2 | 9.3 | 11.1 | YES | YES |
| EX-14 | Di-n-butylamine | 20.8 | 16.9 | 9.3 | 7.7 | 8 | YES | YES |
| EX-15 | Di-isobutylamine | 19.7 | 16.5 | 8.8 | 6.1 | 6.9 | YES | YES |
| EX-16 | Dihexylamine | 19.7 | 16.7 | 8.1 | 6.6 | 6.6 | YES | YES |
| EX-17 | Diheptylamine | 19.3 | 16.6 | 7.8 | 6.1 | 6.2 | YES | YES |
| EX-18 | Dioctylamine | 18.6 | 16.5 | 6.8 | 5.4 | 5.4 | YES | YES |
| EX-19 | Didecylamine | 18.3 | 16.4 | 6.3 | 5 | 5 | YES | YES |
| Comp.1 | Benzylamine | 26 | 20.2 | 12.4 | 10.7 | 15.4 | NO | NO |
| Comp.2 | 1-butylamine | 25.6 | 18.1 | 13.2 | 12.4 | 13.9 | NO | NO |
| Comp.3 | 1-pentylamine | 24.5 | 17.9 | 12.2 | 11.5 | 12.6 | NO | NO |
| Comp.4 | 1-hexylamine | 22.7 | 17.5 | 10.9 | 9.6 | 10.4 | NO | NO |
| Comp.5 | 1-octylamine | 21.9 | 17.4 | 9.9 | 8.8 | 9.3 | NO | NO |
| Comp.6 | 2-ethylhexylamine | 21.7 | 17.3 | 9.7 | 8.8 | 9 | NO | NO |
| Comp.7 | 1-undecylamine | 20.5 | 17.1 | 8.7 | 7.3 | 7.7 | NO | NO |
| Comp.8 | 1-dodecylamine | 20 | 17 | 8.1 | 6.8 | 7 | NO | NO |
| Comp. 9 | 1-Pentadecylamine | 19.3 | 16.8 | 7.4 | 5.9 | 6.2 | NO | NO |
| Ex-20 | 1-Hexadecylamine | 18.9 | 16.7 | 6.9 | 5.4 | 5.8 | YES | YES |
| Ex-21 | 1-Heptadecylamine | 18.8 | 16.7 | 6.7 | 5.4 | 5.6 | YES | YES |
| Ex-22 | 1-Octadecylamine | 18.6 | 16.6 | 6.5 | 5.2 | 5.4 | YES | YES |

In accordance with the present invention, all mono alcohol, all secondary amine, and primary amine with alkyl chains greater than C15 capping agents were compatible.

TABLE 2

Diesel Compatibility of PU Polymers with 100% p-iPO and IPDI with various cap segments (MW = 2700 to 4000 Vs MW = 2000)

| | | Calculated Hansen Solubility Parameters (MPa$^{1/2}$) for End Cap Segment and "End Cap" distance from "Diesel" (Ra) | | | | | Diesel compatibility (1 wt. %) | | |
|---|---|---|---|---|---|---|---|---|---|
| | | | | | | | Polyol MW = 4000 EX. 1-6; EX. 12-17; | Polyol MW = 2700 EX. 1-6; EX. 12-17; | Polyol MW = 2000 |
| Polymer # | End Capping Reagent | $\delta_T$ | $\delta_D$ | $\delta_P$ | $\delta_H$ | Ra | EX. 20-22 | EX. 20-22 | Comp. 10-24 |
| EX-1; Comp 10 | Methanol | 28.4 | 19.1 | 16.0 | 13.6 | 17.5 | YES | YES | NO |
| EX-2; Comp. 11 | 1-Propanol | 23.4 | 17.8 | 11.5 | 10.0 | 11.3 | YES | YES | NO |
| EX-3; Comp. 12 | 2-Propanol | 22.7 | 17.5 | 11.4 | 8.9 | 10.6 | YES | YES | NO |
| EX-4; Comp. 13 | 1-Butanol | 22.7 | 17.5 | 10.4 | 10.0 | 10.2 | YES | YES | NO |
| EX-5; Comp 14 | 2-Butanol | 21.8 | 17.3 | 9.8 | 8.9 | 9.1 | YES | YES | NO |
| EX-6; Comp 15 | Sec-Butanol | 21.7 | 17.2 | 10.1 | 8.5 | 9.1 | YES | YES | NO |

TABLE 2-continued

Diesel Compatibility of PU Polymers with 100% p-iPO and IPDI with various cap segments (MW = 2700 to 4000 Vs MW = 2000)

| | | Calculated Hansen Solubility Parameters (MPa$^{1/2}$) for End Cap Segment and "End Cap" distance from "Diesel" (Ra) | | | | | Diesel compatibility (1 wt. %) | | |
|---|---|---|---|---|---|---|---|---|---|
| Polymer # | End Capping Reagent | $\delta_T$ | $\delta_D$ | $\delta_P$ | $\delta_H$ | Ra | Polyol MW = 4000 EX. 1-6; EX. 12-17; EX. 20-22 | Polyol MW = 2700 EX. 1-6; EX. 12-17; EX. 20-22 | Polyol MW = 2000 Comp. 10-24 |
| EX-12 Comp 16 | Dimethylamine | 26.1 | 18.3 | 14.3 | 11.9 | 14.7 | YES | YES | NO |
| EX-13; Comp 17 | Diethylamine | 23.1 | 17.3 | 12.2 | 9.3 | 11.1 | YES | YES | NO |
| EX-14; Comp 18 | Di-n-butylamine | 20.8 | 16.9 | 9.3 | 7.7 | 8.0 | YES | YES | NO |
| EX-15; Comp 19 | Di-iso-butylamine | 19.7 | 16.5 | 8.8 | 6.1 | 6.9 | YES | YES | NO |
| EX-16; Comp 20 | Dihexylamine | 19.7 | 16.7 | 8.1 | 6.6 | 6.6 | YES | YES | NO |
| EX-17; Comp. 21 | Diheptylamine | 19.3 | 16.6 | 7.8 | 6.1 | 6.2 | YES | YES | NO |
| Ex-20; Comp. 22 | 1-Hexadecylamine | 18.9 | 16.7 | 6.9 | 5.5 | 5.8 | YES | YES | NO |
| Ex-21; Comp. 23 | 1-Hepatadecylamine | 18.6 | 16.6 | 6.5 | 5.2 | 5.4 | YES | YES | NO |
| Ex-22; Comp 24 | 1-octadecylamine | 18.6 | 16.6 | 6.5 | 5.2 | 5.4 | YES | YES | NO |

TABLE 3

Diesel Compatibility of PU Polymers with 100% p-iPO and MDI with various cap segments (MW = 2700 to 4000)

| | | Calculated Hansen Solubility Parameters (MPa$^{1/2}$) for End Cap Segment and "End Cap" distance from "Diesel" (Ra) | | | | | Diesel compatibility (1 wt. %) | |
|---|---|---|---|---|---|---|---|---|
| Example # | End Capping Reagent | $\delta_T$ | $\delta_D$ | $\delta_P$ | $\delta_H$ | Ra | Polyol MW = 4000 EX-23-30; Comp 25-27 | Polyol MW = 2700 EX-23-30; Comp 25-27 |
| EX-23 | Methanol | 28.4 | 19.1 | 16 | 13.6 | 17.5 | YES | YES |
| EX-24 | 1-octanol | 19.8 | 16.9 | 7.6 | 6.9 | 6.6 | YES | YES |
| EX-25 | Docosanol | 17.1 | 16.2 | 4.3 | 3.4 | 4.4 | YES | YES |
| EX-26 | Dimethylamine | 26.1 | 18.3 | 14.3 | 11.9 | 14.7 | YES | YES |
| EX-27 | Dihexylamine | 19.7 | 16.7 | 8.1 | 6.6 | 6.6 | YES | YES |
| EX-28 | Didecylamine | 18.3 | 16.4 | 6.3 | 5 | 5 | YES | YES |
| Comp. 25 | 1-butylamine | 25.6 | 18.1 | 13.2 | 12.4 | 13.9 | NO | NO |
| Comp. 26 | 1-octylamine | 21.9 | 17.4 | 9.9 | 8.8 | 9.3 | NO | NO |
| Comp. 27 | 1-Pentadecylamine | 19.3 | 16.8 | 7.4 | 5.9 | 6.2 | NO | NO |
| Ex-29 | 1-Hexadecylamine | 18.9 | 16.7 | 6.9 | 5.5 | 5.8 | YES | YES |
| Ex-30 | 1-Octadecylamine | 18.6 | 16.6 | 6.5 | 5.2 | 5.4 | YES | YES |

In accordance with the present invention, all mono alcohol, all secondary amine, and primary amine with alkyl chains greater than C15 capping agents were compatible

The invention claimed is:

1. A method for preserving wood comprising:
   contacting wood with a wood preservation composition comprising
   a) a polyurethane polymer synthesized from
      i) a polyol comprising >95% p-propylene oxide,
      ii) an isocyanate, and
      iii) a capping agent;
   b) an organic solvent; and
   c) at least one wood preservative active selected from among halogenated isothiazolone biocides, halogenated carbamate fungicides and azole fungicides;
   wherein the capping agent is selected from the group consisting of a mono alcohol, a secondary amine, a primary amine with alkyl chain greater than C15 and mixtures thereof; and further wherein the molecular weight of the polyol is greater than or equal to 2700.

2. The method of claim 1 wherein the at least one wood preservative active is 4,5-dichloro-2-n-octyl-4-isothiazolin-3-one.

3. The method of claim 1 wherein the organic solvent comprises diesel.

4. The method of claim 1 wherein the polyol comprises 100% p-propylene oxide.

5. The method of claim 1 wherein the isocyanate is a diisocyanate.

6. A wood preservation composition comprising
a) a polyurethane polymer synthesized from
  i) a polyol comprising >95% p-propylene oxide,
  ii) an isocyanate, and
  iii) a capping agent;
b) an organic solvent; and
c) at least one wood preservative active selected from among halogenated isothiazolone biocides, halogenated carbamate fungicides and azole fungicides;
wherein the capping agent is selected from the group consisting of a mono alcohol, a secondary amine, a primary amine with alkyl chain greater than C15 and mixtures thereof; and further wherein the molecular weight of the polyol is greater than or equal to 2700.

7. The composition of claim 6 wherein the at least one wood preservative active is 4,5-dichloro-2-n-octyl-4-isothiazolin-3-one.

8. The composition of claim 6 wherein the organic solvent comprises diesel.

9. The composition of claim 6 wherein the polyol comprises 100% p-propylene oxide.

10. The composition of claim 6 wherein the isocyanate is a diisocyanate.

\* \* \* \* \*